N. THOMAS.
BOLL WEEVIL DESTROYING PLOW.
APPLICATION FILED APR. 6, 1918.
1,297,933. Patented Mar. 18, 1919.
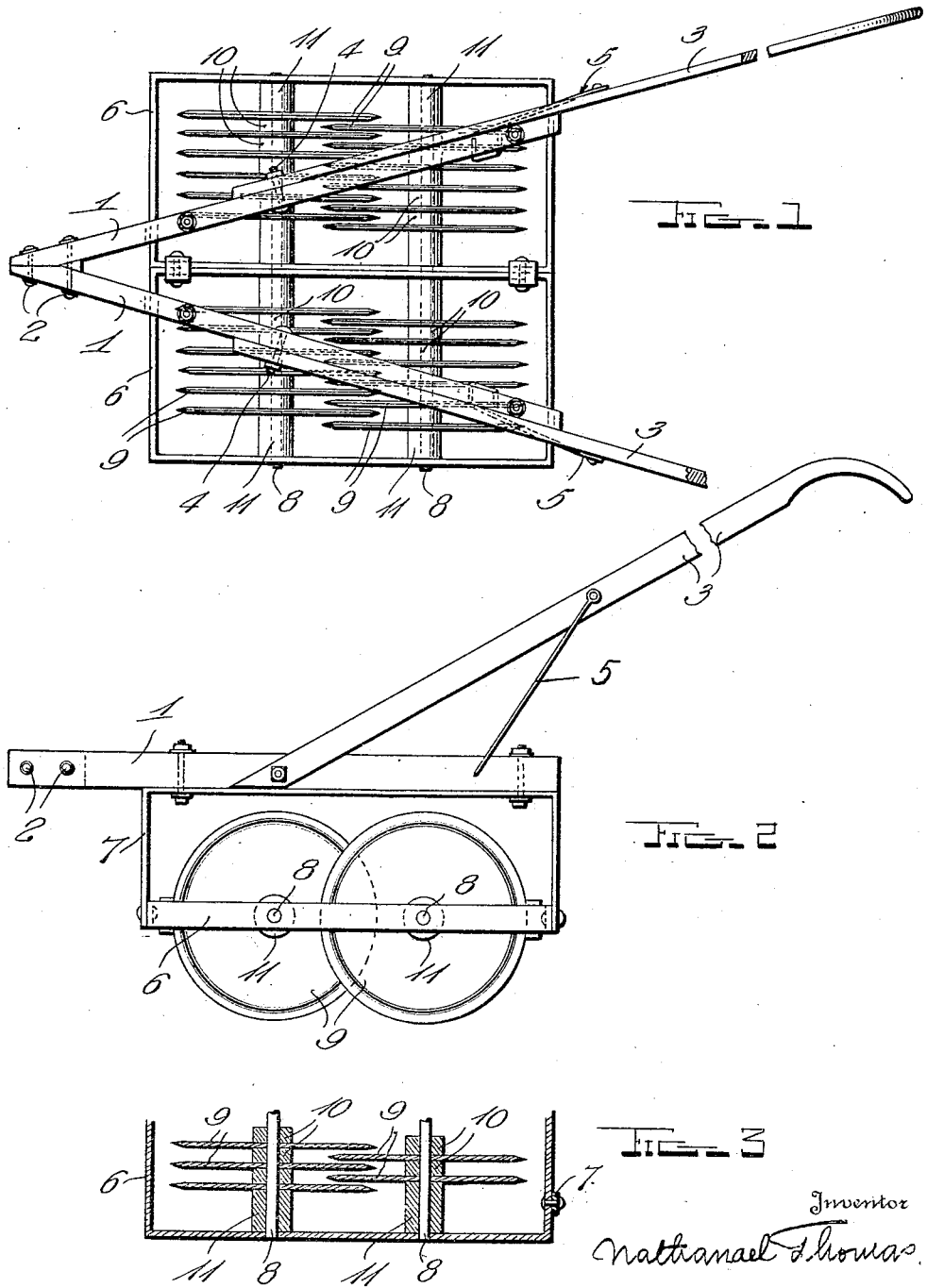

UNITED STATES PATENT OFFICE.

NATHANAEL THOMAS, OF KEO, ARKANSAS.

BOLL-WEEVIL-DESTROYING PLOW.

1,297,933. Specification of Letters Patent. Patented Mar. 18, 1919.

Application filed April 6, 1918. Serial No. 227,082.

*To all whom it may concern:*

Be it known that I, NATHANAEL THOMAS, a citizen of the United States, residing at Keo, in the county of Lonoke and State of Arkansas, have invented new and useful Improvements in Boll-Weevil-Destroying Plows, of which the following is a specification.

My present invention pertains to plows and the like; and it consists in a plow, hereinafter described and definitely claimed, constructed and arranged to cut into minute pieces the "squares" that fall from the stalks of cotton plants after boll-weevil puncture and lay eggs in the "squares" and the latter fall to the ground, and also constructed and arranged to pulverize the surface of the soil and thereby promote the growth of the plants.

By cutting the "squares" as stated the eggs are destroyed and hatching thereof is prevented, and hence when the old boll-weevil are dead the devastation due to the pest is ended.

In the accompanying drawings, which are hereby made a part hereof:

Figure 1 is a plan view showing a plow constructed in accordance with my invention.

Fig. 2 is a side elevation of the same.

Fig. 3 is a detail view illustrative of the manner of lapping the disks of the forward and rear groups.

Similar numerals of reference designate corresponding parts in all of the several views of the drawings.

The main frame of my novel plow is made up of two rearwardly diverged wooden members 1. These members 1 are fixedly connected together adjacent to their forward ends, as indicated by 2, and the frame formed by the members 1 is equipped with handles 3, connected at 4 to the members 1 and braced through the medium of interposed struts 5.

Disposed below the main frame and arranged side by side are two rectangular sub-frames 6, of metal. These sub-frames are connected together adjacent to their forward and rear ends, and are connected through the medium of hangers 7 with the members 1 of the main frame. Each of the hangers 7 comprises an intermediate portion disposed under and fixedly connected to one member 1 and depending portions at the ends of the intermediate portion and fixedly connected to the end bars of the sub-frames 6. As clearly shown there is one hanger 7 to each sub-frame 6.

Mounted in the side bars of the sub-frames 6 are transverse shafts 8, and mounted in a loose manner on the said shafts are cutting disks 9. The disks 9 complementary to each shaft are spaced apart by interposed collars 10 on the shaft, and the outer disks of the shaft are spaced from the side bars of the sub-frame by comparatively long collars 11, also mounted on the shaft. There are two groups of disks 9 in each sub-frame 6, and in practice the disks of each group are arranged about three eighths of an inch apart. Moreover the disks of the forward and rear groups in each sub-frame are lapped to about the extent illustrated with the result that the spaces between the lapped portions of the disks are of a width equal to one half of that indicated, and consequently the co-operating disks of the forward and rear groups are adapted to finely cut the fallen "squares" encountered in their paths.

It will also be observed that there are two sets of forward and rear groups of disks 9, and that the said sets are spaced longitudinally apart so that when the plow is drawn or otherwise moved between rows of cotton plants each set will be positioned to finely cut the "squares" that fall from the stalks of the plants at one side of the path of the plow.

I prefer in practice to use my novel plow every eight or ten days after the boll-weevil starts puncturing, and the "squares" begin to fall, the land being cultivated as flat as possible, and when this course is pursued the disks 9 by cutting the "squares" into minute portions will destroy the eggs of the boll-weevil with the result that when the old boll-weevil are dead the pest will abate.

It will also be appreciated that incidental to the reduction of the "squares" to small pieces and the consequent destruction of the boll-weevil eggs, the disks 9 will operate to pulverize the surface portion of the soil as is desirable.

Having described my invention, what I claim and desire to secure by Letters Patent, is:

In a plow for the purpose described, the combination of rearwardly diverging members, connected to each other adjacent their forward ends and forming a frame; said frame having handles connected to the said members and further being braced by struts, a pair of rectangular sub-frames arranged below the said members and connected to each other adjacent their forward and rear ends, hangers for connection of the sub-frames to the rearwardly, diverging members; said hangers comprising an intermediate portion disposed under and connected to one rearwardly diverging member, and further having depending portions at the ends of the intermediate end portion fixedly connected to end bars of the sub-frames, shafts mounted in the side bars of the sub-frames, and earth working elements carried by the sub-frame.

In testimony whereof I have hereunto set my hand in presence of two subscribing witnesses.

NATHANAEL THOMAS.

Witnesses:
C. M. FLYNN,
M. L. LEACH.

Copies of this patent may be obtained for five cents each, by addressing the "Commissioner of Patents, Washington, D. C."